US008842661B2

(12) United States Patent
Liu

(10) Patent No.: US 8,842,661 B2
(45) Date of Patent: Sep. 23, 2014

(54) PROXY TELEPHONE NUMBER SYSTEM FOR COMMUNICATION NETWORK SUBSCRIBERS

(75) Inventor: Antonio Hao Yi Liu, ChangZhou (CN)

(73) Assignee: Alcatel Lucent, Boulogne-Billancourt (FR)

( * ) Notice: Subject to any disclaimer, the term of this patent is extended or adjusted under 35 U.S.C. 154(b) by 2079 days.

(21) Appl. No.: 11/477,987

(22) Filed: Jun. 29, 2006

(65) Prior Publication Data

US 2007/0189264 A1     Aug. 16, 2007

(30) Foreign Application Priority Data

Jan. 27, 2006 (CN) .......................... 2006 1 0082044

(51) Int. Cl.
*H04L 12/66* (2006.01)
*H04M 3/42* (2006.01)
*H04M 3/46* (2006.01)
*H04M 7/12* (2006.01)

(52) U.S. Cl.
CPC .. *H04M 3/46* (2013.01); *H04M 7/12* (2013.01)
USPC ..................... 370/352; 379/211.03

(58) Field of Classification Search
CPC ..................................................... H04M 3/424
USPC .................... 370/352; 379/211.02–211.04, 379/207.14–207.15, 211.03, 214.01, 201.11
See application file for complete search history.

(56) References Cited

U.S. PATENT DOCUMENTS

| 5,793,859 | A | * | 8/1998 | Matthews | 379/211.03 |
| 6,104,799 | A | * | 8/2000 | Jain et al. | 379/211.01 |
| 2004/0170258 | A1 | * | 9/2004 | Levin et al. | 379/88.01 |
| 2005/0069097 | A1 | * | 3/2005 | Hanson et al. | 379/88.12 |
| 2005/0074101 | A1 | * | 4/2005 | Moore et al. | 379/114.01 |
| 2005/0213741 | A1 | * | 9/2005 | Malik et al. | 379/211.03 |

* cited by examiner

*Primary Examiner* — Nicholas Jensen
(74) *Attorney, Agent, or Firm* — McCormick, Paulding & Huber LLP

(57) ABSTRACT

A proxy telephone system and method is implemented on or as part of a communication network. Proxy telephone numbers are assigned to network users or subscribers. The phone numbers for a user's various communication terminals (e.g., GSM wireless unit, PHS wireless unit, home telephone, work telephone) are associated with the user's proxy number in a database. When a caller initiates a call over the network, the system determines if the dialed phone number is a proxy number. If so, the system accesses the list of phone numbers associated with the proxy number. The system automatically sequentially routes the call to the phone numbers associated with the proxy number in a pre-determined order until a connection is established. For example, the system might first route the call to the GSM wireless unit, and then to the PHS unit, and so on, until the user answers.

20 Claims, 3 Drawing Sheets

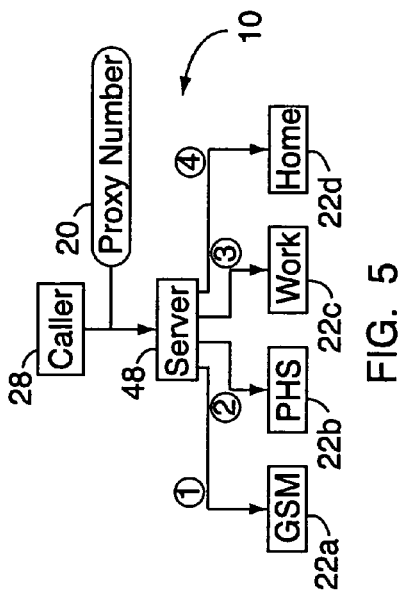
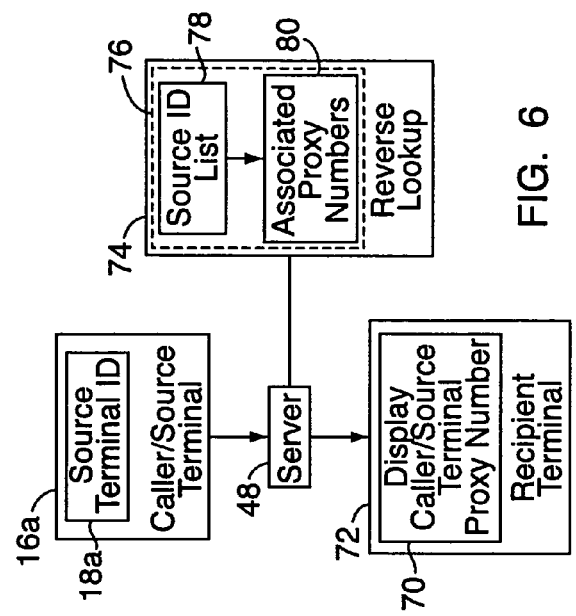
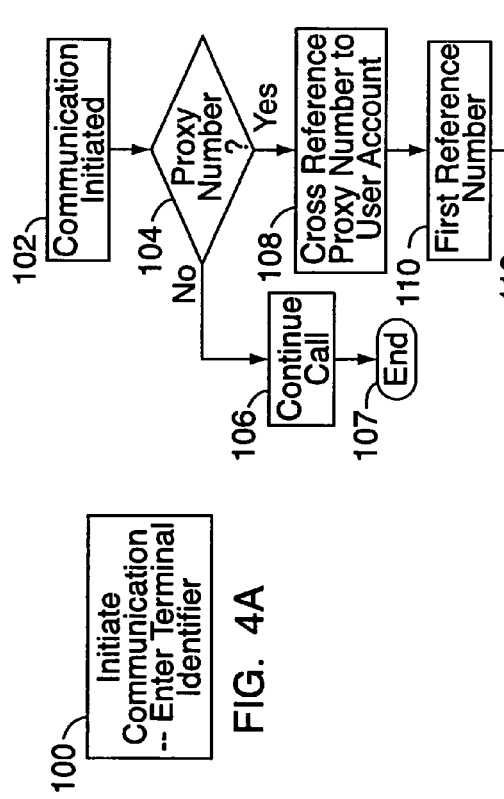
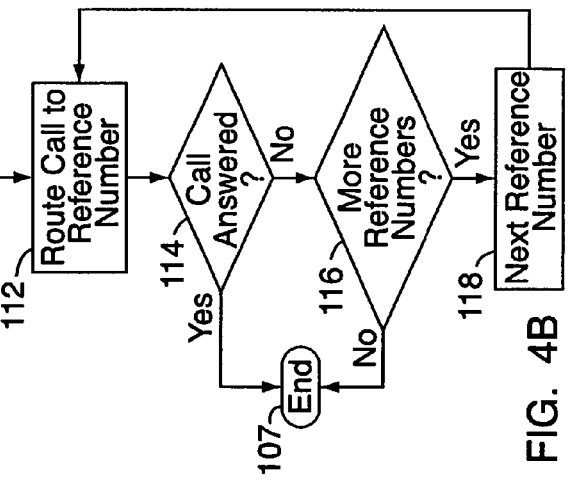

PROXY TELEPHONE NUMBER SYSTEM FOR COMMUNICATION NETWORK SUBSCRIBERS

This application is entitled to the benefit of and claims foreign priority under 35 U.S.C. §119 from Chinese Patent Application No. 200610082044.9, filed Jan. 27, 2006, the disclosure of which is hereby incorporated by reference.

FIELD OF THE INVENTION

The present invention relates to communications and, more particularly, to services for telecommunication systems.

BACKGROUND OF THE INVENTION

In the modern age, people have a number of options for communicating with one another over long distances. These include traditional mail (made more expedient due to advances in transportation technology), e-mail through computer networks such as the Internet, and direct, high-speed voice, video, and data communications through computer networks, traditional circuit-switched, landline-based telecommunication (phone) networks, and wireless communication networks. Many people take advantage of multiple modes of communication and, as such, may have a number of different accounts, contact identifiers (e.g., phone numbers, e-mail addresses), or the like. For example, as shown in FIG. 1, a communication user may have a work phone number, a home phone number, a wireless unit (e.g., mobile phone) number, and home and work e-mail addresses. Moreover, as wireless technology has expanded, this has resulted in certain geographic areas having overlapping or patchwork wireless coverage, meaning that some network users may have two or more wireless units, each with its own phone number. For example, especially in certain Asian countries, many people carry both a GSM (Global System for Mobile Communications) unit and a PHS (Personal Handyphone System) unit, each of which has a separate account and phone number. Still further, some people also carry satellite phones.

In light of these numerous options, for a caller to contact a person by phone, the caller has to sequentially enter each of the person's phone numbers until the person is reached. For example, if there is no answer (or if the unit's power is off or if voice-mail is reached) at the number for the person's GSM unit (or other primary wireless unit), the caller then has to call the PHS unit, then the work number, and so on. Moreover, the caller has to remember or otherwise have access to all these phone numbers. Dialing the numbers can be irksome, especially in situations where the caller's attention is otherwise occupied such as when driving a vehicle.

SUMMARY OF THE INVENTION

An embodiment of the present invention relates to a method and system for communicating over a network such as a wireless and/or wire line telecommunication or telephone network. A communication is initiated over the network in a standard manner, e.g., by a caller entering an initial identifier into a terminal. (By "initial identifier," it is meant an alphanumeric string, address, code, or other identifier used to contact and/or identify a terminal in the network, e.g., a telephone number, as entered into the terminal for initiating a communication; "terminal" refers to a device for communicating over the network, such as a telephone, computer, mobile phone or other wireless unit, or the like.) The system then determines if the initial identifier is a proxy identifier. A "proxy" identifier is not directly associated with an individual terminal, but instead to a list of identifiers ("reference identifiers") each associated with a terminal used by a network user/subscriber. If the initial identifier is a proxy identifier, the system routes the communication to the terminals on the list in a sequential order until a desired connection is established to one of the terminals, e.g., the call is answered.

In another embodiment, the sequential order is based on one or more pre-established routing criteria. (By "pre-established," it is meant that the criteria are set or decided upon prior to and/or independent of communications being routed to the reference identifiers; this may be done by a user of the proxy identifier, or by the system, e.g., default routing criteria.) The routing criteria may include, for example, a designated order of the reference identifiers, the time of day or calendar date, a random order, or an order based upon prior attempts at routing communications to particular reference identifiers. Thus, the order of the reference identifiers to which communications are routed may be static, or it may vary as determined by the routing criteria, selected by the user of the proxy identifier or otherwise.

In another embodiment, reference numbers for the different communication terminals that the user/subscriber accesses on a regular basis (e.g., a GSM wireless unit, a PHS wireless unit, a work telephone, and a home telephone) are included on a list associated with a proxy number assigned to the user. The proxy number may be formatted the same as a standard phone number. Instead of having to disseminate all the reference numbers/identifiers to persons who may wish to contact the user, the user only has to distribute the proxy number. Also, instead of a caller having to dial many different telephone numbers in an attempt to reach the user, the caller merely dials the proxy number. The call is first directed to a first reference number on the list, as designated by the user/subscriber. For example, the user may access a website to add and remove reference numbers to the list, and to establish the order of the reference numbers on the list. If the call to the first reference number does not result in a desired connection, e.g., if the user does not answer the phone in person, the call is then routed to each of the other reference numbers on the list, in a sequential order as established by the user, until a desired connection is established or the end of the list is reached.

In another embodiment, if the number/identifier initially entered by the caller is not a proxy number, the call is routed in a standard manner to the terminal associated with the initially entered identifier. Typically, all communications over the network are monitored for determining if entered phone numbers (or other identifiers) are associated with proxy identifiers.

In another embodiment, the proxy number method/system is deployed at a central location in the network, e.g., a network controller, by way of a script or other computer program or suite of computer programs acting in concert with a database for storing the proxy numbers and lists/records of the reference numbers respectively associated with the proxy numbers.

In another embodiment, the proxy number method/system is also used as a "firewall" for displaying the caller's proxy number instead of the caller's actual terminal identifier on a recipient terminal's "caller ID" function. (By "caller ID" function, it is meant a system in place on the network wherein the identifier of a terminal initiating a communication is transmitted and displayed on the display of the recipient terminal, i.e., the terminal that is being called or otherwise contacted.) When the caller initiates a call or other communication, the system determines if the identifier for the caller's terminal is associated with a proxy number/identifier. If so, the system transmits the proxy number as the identifier to be displayed on the recipient's display for the caller ID function.

BRIEF DESCRIPTION OF THE DRAWINGS

The present invention will be better understood from reading the following description of non-limiting embodiments, with reference to the attached drawings, wherein below:

FIGS. 4A and 4B are flowcharts showing the steps of operation of one embodiment of the proxy number system;

FIG. 5 is a schematic diagram of the proxy number system in operation; and

FIG. 6 is a schematic diagram of proxy caller ID function according to an additional embodiment of the present invention.

DETAILED DESCRIPTION

Figure 1:
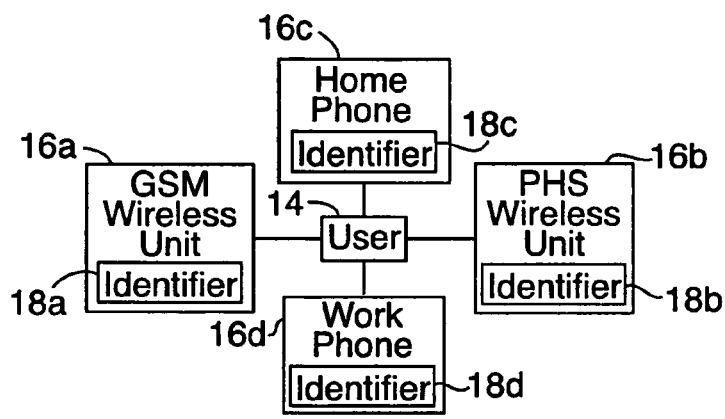
FIG. 1 is a schematic diagram showing the different telecommunication means used by a typical network user.

With reference to FIGS. 1-5, a proxy communication identifier system and method 10 is implemented on or as part of a communication network 12. A network user or service subscriber 14 has a number of different accounts/terminals 16a-16d for communicating over the network, each of which has a unique communication identifier 18a-18d. (As noted above, a communication identifier is an alphanumeric string, address, code, or other identifier used to contact and/or identify a terminal in the network, such as a telephone number; a "terminal" is a device used to communicate over the network, such as a telephone, computer, mobile phone or other wireless unit, or the like.) Thus, the user may have a GSM wireless unit 16a with an identifier 18a, a PHS wireless unit 16b with an identifier 18b, a home telephone 16c with a home telephone number 18c, a work telephone 16d with a work telephone number 18d, various e-mail addresses, and the like. The user is assigned a proxy identifier 20, which will typically be formatted the same as other communication identifiers used in the network 12, e.g., the proxy identifier 20 may be a proxy telephone number. One or more of the user's communication identifiers 18a-18d are associated with the proxy identifier 20, as "reference" identifiers 22a-22d, in a list, entry, or record 24a-24c in a database 26. When a caller or other user 28 initiates a call or other communication using the proxy identifier 20, the system 10 automatically sequentially routes the call to the reference identifiers 22a-22d in a pre-established order, until a connection is established. Thus, instead of a caller having to enter additional phone numbers or other identifiers if a call to a first number is not answered, a single proxy number is entered for the person the caller wants to contact, with the system 10 automatically calling all the reference numbers until the person is contacted or all the numbers are exhausted.

Figure 2:
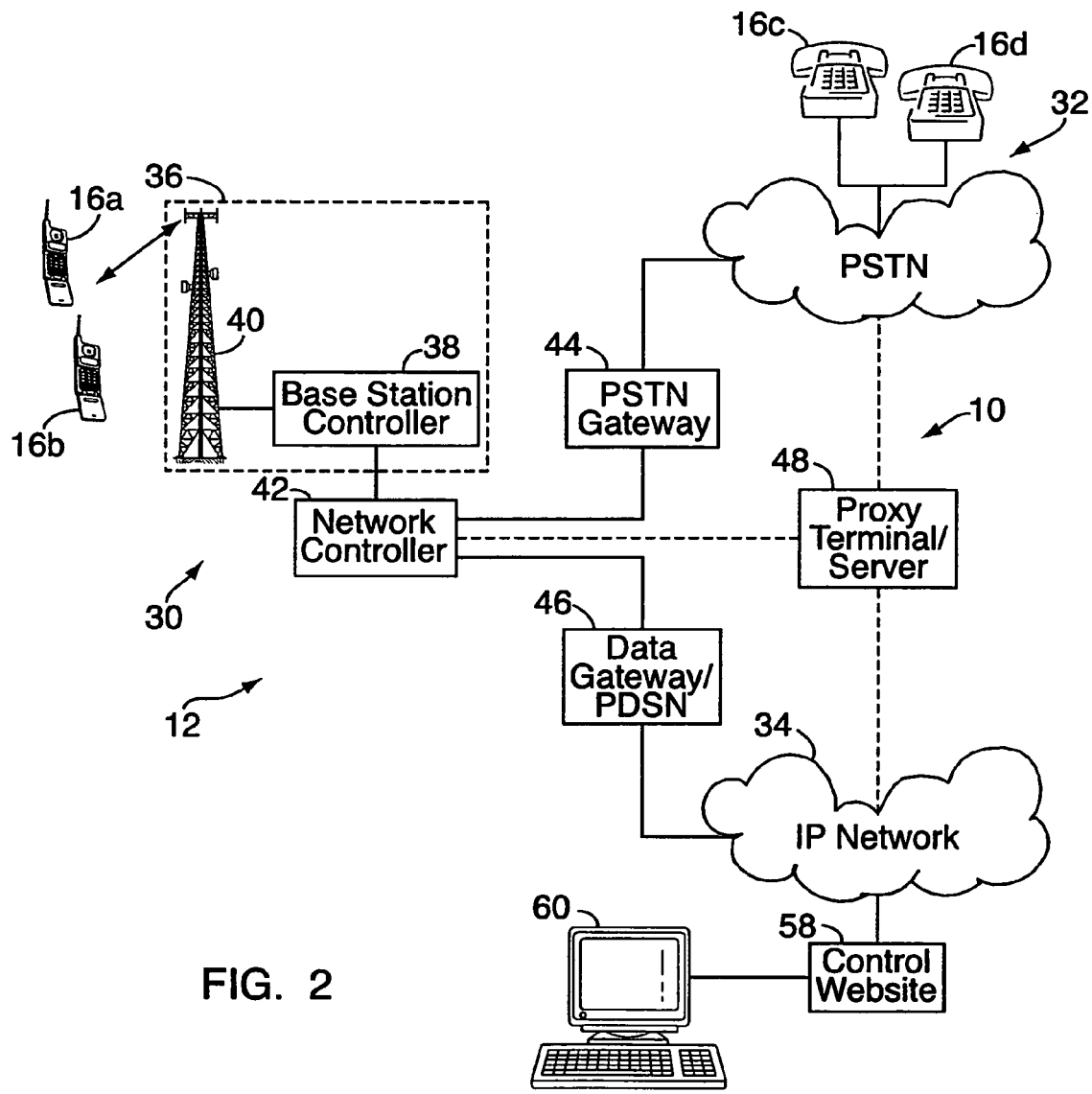
FIG. 2 is a schematic diagram of a communication network with proxy communication identifier system (e.g., proxy telephone number system) implemented thereon according to an embodiment of the present invention.

The proxy number system/method 10 may be implemented on different types of communication networks 12, including wireless networks, circuit-switched telephone networks, data networks, and/or networks including both landline and wireless voice and data communications. One example of such a network is shown in FIG. 2 in a generalized, simplified sense for explanatory purposes. In FIG. 2, the communication network 12 includes a radio access network 30, a public switched telephone network 32 ("PSTN"), and a packet data network 34. The radio access network 30 has one or more fixed base stations 36 each with a base station controller 38 and various transceivers and antennae 40 for wireless, radio-frequency communications with a number of distributed wireless units such as a GSM wireless unit 16a and a PHS wireless unit 16b (As should be appreciated, the different types of wireless units may be supported by different wireless networks/infrastructure, e.g., typically there might be one radio access network for GSM wireless units and another for PHS units.) The base stations 36 are in turn interfaced with the data network 34 and/or PSTN 32 through one or more wireless network controllers or control centers 42, which act as the interface between the wireless/radio end of the radio access network 30 and the data network 34 and PSTN 32, including performing the signaling functions necessary to establish calls and other data transfer to and from the wireless units 16a, 16b The controller 42 may be part of the base station equipment, or it may be a separate mobile switching center, radio network controller, or the like that services a number of base stations. Wireless communications between the base stations 36 and wireless units 16a, 16b are carried out using standard methods depending on the type and configuration of the radio access network(s). For example, the radio access network 30 may be a GSM network, a CDMA-based, 1x-EVDO network, or the like.

The PSTN 32 will typically be a public, landline-based telephone network. The PSTN 32 may use circuit-switched communication methods, packet-switched methods, or a combination of the two. The radio network controller 42 may be connected to the PSTN 32 by way of a PSTN gateway 44, which allows the wireless units 16a, 16b to access PSTN services such as originating and receiving PSTN calls, e.g., calls to public landline phones 16c, 16d. Similarly, the network controller 42 may be connected to a data gateway or packet data serving node ("PDSN") 46 for access to circuit- and packet-switched data services or networks such as the packet data network 34. The packet data network 34 will typically be an Internet-protocol (IP) based data network such as the Internet. The radio network 30 and/or PSTN 32 may utilize public or private IP data networks for core data transfer functions or the like.

The network 12 is shown in FIG. 2 in a simplified form for explanatory purposes. Thus, the network 12 will typically include a number of additional elements not shown in the drawings, depending on the particular type and configuration of the network on which the system 10 is implemented.

The proxy number system 10 may be deployed in a standard manner at one or more locations in the network 12, depending on the particular configuration of the network. For example, the system 10 may be implemented at a central location in the network by way of a script or other computer program or suite of computer programs running on a network controller or the like. For illustration purposes, the system 10 is shown in FIG. 2 as implemented in conjunction with a proxy terminal or server 48 (e.g., computer terminal) that is interfaced with the radio network 30, packet data network 34, and PSTN 32.

Figure 3:
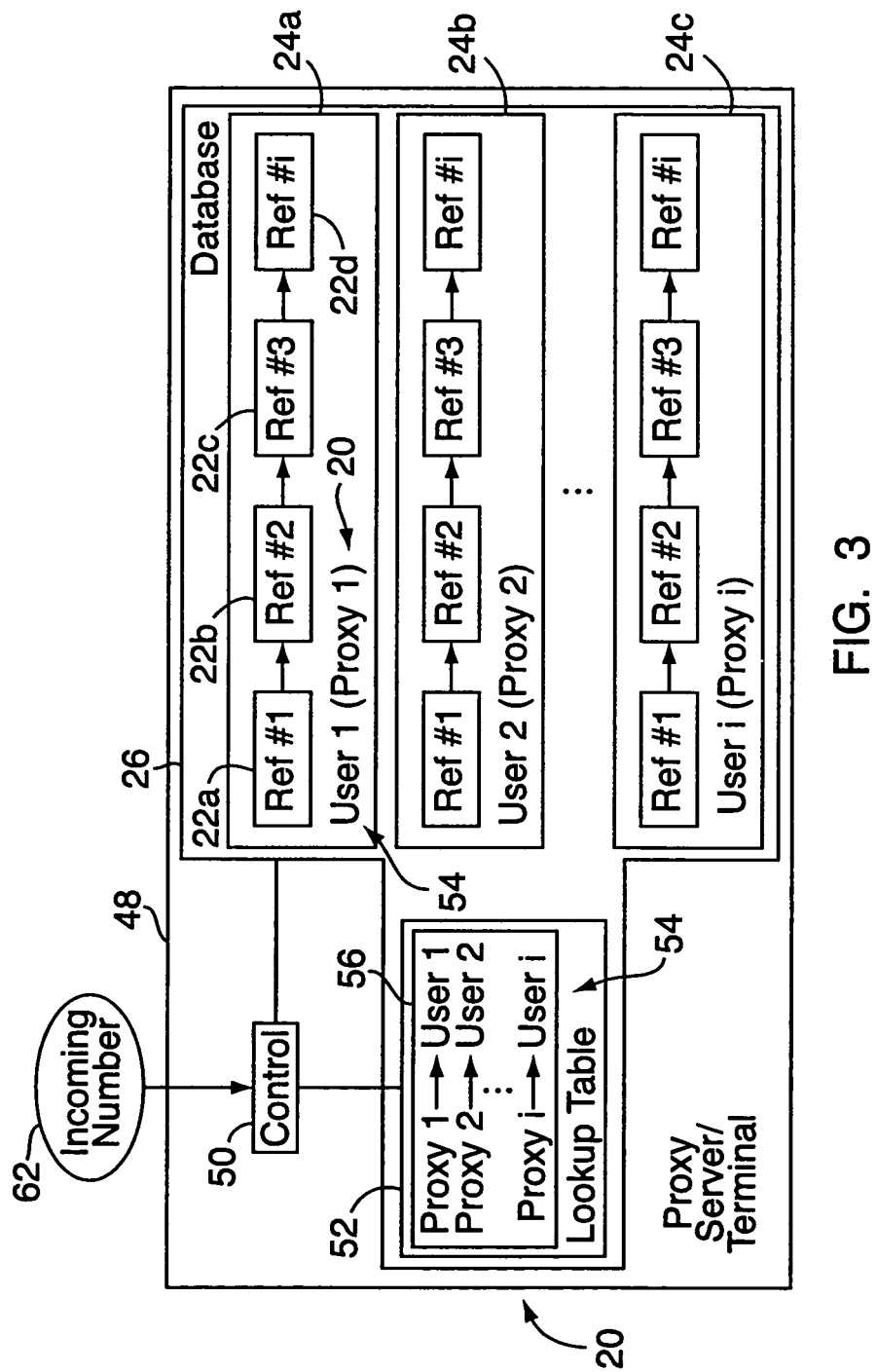
FIG. 3 is a schematic diagram of a server portion of the proxy number system.

With reference to FIG. 3, the proxy server 48 (or other hardware/software for implementing the system/method 10) includes a control program 50, the database 26, and a proxy identifier lookup table 52, which may be stored as part of the database 26. The database 26 includes a number of records (or lists or sets of records) 24a-24c each for a different network user/subscriber. Each record 24a-24c may include a user ID 54 (e.g., name, account number, or the like), the user's proxy identifier 20, and a list of the reference identifiers 22a-22d associated with the proxy identifier 20. As noted above, the reference identifiers 22a-22d are terminal identifiers 18a-18d that have been associated with a proxy identifier 20; in other words, each reference identifier is a terminal identifier that has been associated with or linked to a proxy identifier by a user 14. The records 24a-24c may each contain any number of reference identifiers, within limits set by the system 10. For example each user may be allocated a maximum number of reference identifiers. The lookup table 52 is an optional list or index that the system 10 uses to quickly access the record 24a-24c for a particular user. Thus, the lookup table 52 includes a number of entries 56 listing the proxy identifiers 20 in the system 10 and the user ID's 54 respectively associated with the proxy identifiers. Instead of using such an indexing means, it may be possible for the proxy server 48 to simply cross-reference the proxy identifier 20 to the database records 24a-24c. However, depending on the size and number of the records 24a-24c, this may take longer than first searching the lookup table 52 and proceeding directly to a particular record 24a-24c. Many different data storage configurations and lookup/cross-referencing/indexing methods are available, as well known in the data processing arts.

In the system 10, communications initiated using a proxy identifier 20 are automatically sequentially routed to the reference identifiers 22a-22d associated with the proxy number in a record 24a-24c, until a desired connection is established. To set the order in which communications are to be routed, a user 14 designates the order of the reference identifiers 22a-22d in the user's database record or other entry 24a-24c. (This means that the reference identifiers are not necessarily sequentially arranged in the database or memory, but that the desired order is pre-established through a selection and designation process, with a notation or other data of the selected order being maintained in the database 26.) This may be done through one or more means such as initial account setup, command entries into a phone terminal 16a-16d after connecting to a designated service number, or by way of accessing a user control website 58 interfaced with the proxy server 48 over the data network 34. The website 58 could be implemented and configured in a standard manner, and accessed by way of a computer terminal 60 to which the user has access.

The order of the reference identifiers 22a-22d may also be determined using one or more dynamic, user- or system-set routing conditions, formulas, or other criteria such that the actual order of routed communications as carried out by the system 10 might vary, but within set constraints. For example, the order could be set to depend on the time of day, the calendar date, network traffic conditions, the manner in which the routed communication was answered (e.g., voice mail) or not answered, or the like. The order could also be determined based on a random selection of the reference identifiers, or it could vary based on tracked prior attempts to route communications to the reference identifiers. For example, a user could specify that if the system had attempted to route communications to a particular reference identifier a particular number of times within a set time period, without answer or other designated response, the reference identifier would be bypassed for future re-routings until the system was reset or a certain time period had elapsed. The routing criteria will typically be selected by the user of the proxy identifier, but may also be selected by the system 10, e.g., a default criterion may be used unless the user selects other criteria.

Operation of the proxy number system 10 will now be further described with reference to FIGS. 4A, 4B, and 5. At Step 100 in FIG. 4A, a caller or other person 28 initiates a communication over the network 12. This may be done in a standard manner, for example by the caller entering a terminal identifier 62, e.g., a phone number, into the caller's terminal, e.g., mobile phone or other wireless unit. At Step 102 in FIG. 4B, the network 12 recognizes the initiated communication in a standard manner, according to network configuration and the communication protocols in place on the network. Information relating to the initiated communication, and in particular at least the terminal identifier 62 used to initiate the communication, is routed to the proxy server 48. (As should be appreciated, the communication itself may be routed through the server, or, more typically, the functionality of the server 48 may be implemented on the network components already used to route and direct calls; for example, the server 48 could be implemented as a controlled database system in place on a network controller configured to process, direct, and route calls or other communications.) At Step 104, the control program 50 of the proxy server 48 determines if the initial identifier 62 is a proxy identifier 20. This may be done in several ways. For example, the proxy identifier 20 may be formatted in a manner unique to proxy identifiers, e.g., formatted or configured in a manner different from the terminal identifiers 18a-18d. Alternatively, the caller terminal may transmit a signal, code, or the like indicating that the identifier 62 is a proxy identifier 20. More typically, however, the proxy server 48 will access the database 26 to determine if the identifier 62 is listed therein as a proxy identifier.

If it is determined that the initial identifier 62 is not a proxy identifier, the call or other communication is routed to the identifier 62 (or, more specifically, to the terminal associated with the identifier 62) in a standard manner, as at Step 106. In other words, the communication is continued in a normal manner, and the process of the system 10 ends at Step 107. If the initially entered identifier 62 is found to be a proxy identifier 20, at Step 108 the proxy server 48 finds the record 24a in the database 26 for that proxy number. This may be done by first cross-referencing or correlating the proxy number to a user account number 54 in the lookup table 52 (or to some other index), and then referencing the user account number 54 to the records 24a-24c in the database 26. Alternatively, this may be done by directly correlating the proxy number 20 to the records 24a-24c in the database 26, to find the particular record 24a associated with the proxy number, through a lookup or searching function or the like.

Once the system finds the record 24a for the proxy identifier 20 in the database 26, at Step 110 the system looks through the record 24a to find the first reference identifier 22a, or, more specifically, the reference number 22a that the user 14 has designated as being the first to which calls or other communications should be routed in the system 10. Again, as noted above, the effective order of the reference identifiers may be determined by the system based on dynamically run criteria selected by the user, such as time of day, date, or the like. At Step 112, the system routes the communication to the first reference identifier 22a, e.g., the system attempts to establish a connection with the terminal 16a of the reference identifier 22a. This is done in a standard manner, in effect by the system 10 automatically "dialing" the reference identifier 22a instead of the proxy identifier 20. At Step 114, it is determined if a desired connection has been established with the "recipient" terminal 16a, i.e., the terminal at the receiving end of the initiated communication. For example, the system might determine if the initiated communication has been answered at the recipient terminal. The determination might also be made according to one or more criteria selected by the user 14 and/or pre-established on the system 10 according to a desired level of functionality. For example, the system 10 may only determine that a desired connection has been established upon a "hard answer" condition, by which it is meant a determination that the user 14 has actually answered the communication in person by picking up a handset on a landline terminal or by activating the "answer" button on a wireless unit. Other criteria may include a power off condition, e.g., the recipient terminal is powered down, a "soft answer" condition, e.g., the initiated communication is answered but by an electronic service such as voice-mail, and a no answer condition, e.g., the terminal is powered up but there is no answer, either "physical" or electronic. Such criteria may be non-modifiable, or they may be user selected by way of the website 58 or the like. For example, the user could establish that an initiated communication is to be first routed to a GSM wireless unit 16a and then to other terminals 16b-16d, but only if neither the user nor voice-mail answers the GSM unit.

If it is determined that a desired connection has been established at Step 114, the process ends for the particular initiated communication. If not, e.g., if there is no answer at the recipient terminal, the proxy server 48 may determine if there are any reference identifiers 22b-22d remaining in the record 24a, as at Step 116. If not, the process ends. Alternatively, the system may be configured to re-route the communication to one of the previously attempted reference identifiers, e.g., to one where voice-mail, but not a hard answer, was reached. (In other words, the system could route the communication to all the reference numbers until a hard answer is detected or, if no hard answer is detected, to the first reference number where a voice-mail system answered the initiated communication.) If so, at Step 118 the next reference identifier 22b in the record/list 24a is determined, and the communication is routed to that identifier 22b, back at Step 112. The process is automatically repeated, on each of the reference identifiers 22a-22d in a sequential manner as pre-established by the user 14, until a desired connection is established or all the reference identifiers are exhausted.

Proxy identifiers 20 may be assigned to users 14 who have subscribed to the service implemented through the system 10. As noted, the proxy identifiers will typically be formatted similarly to the terminal identifiers 18a-18d on the network 12, e.g., as standard telephone numbers, e-mail addresses, IP addresses, or the like. Regarding the latter, the system 10 could be implemented for data communications. For example, a data communication over the network 34 could be initiated using a proxy IP address. The communication would first be routed to a first recipient terminal having a reference identifier associated with the proxy IP address in the database 26. If the communication were not received, acknowledged, etc. at the first recipient terminal, the communication could then be routed to a second or subsequent terminals until desired connection criteria were met.

With reference to FIG. 6, the proxy number method/system 10 may also used as a "firewall" for displaying the caller's proxy number 20 instead of the caller's actual terminal identifier 18a on the "caller ID" function 70 of a recipient terminal 72. By "caller ID" function, it is meant a system in place on the network 12 wherein the identifier of a terminal initiating a communication is transmitted and displayed on the display of the recipient terminal; examples/synonyms include calling line identification (CLI), caller display, calling line identification presentation (CLIP), call capture, and calling line identity (CLID). When the caller 28 initiates a call or other communication at a source or initiating terminal 16a having a terminal identifier 18a, the system 10 determines if the terminal identifier 18a is associated with a proxy number or other identifier 20. This may be done by referencing a reverse lookup table 74 having a list 76 of terminal identifiers 78 and their associated proxy numbers 80. If the terminal identifier 18a is on the list 78, the system transmits the proxy number 20 with which the terminal identifier is associated as the identifier to be displayed on the recipient terminal 72 for the caller ID function 70, instead of the terminal identifier 18a.

Since certain changes may be made in the above-described proxy communication identifier system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method for communicating over a network, said method comprising:
   determining if an initial identifier for a phone call initiated over the network has a plurality of reference identifiers associated therewith, wherein the plurality of reference identifiers are for a plurality of terminals accessed by an individual network user; if so,
   automatically routing the phone call to the plurality of reference identifiers in a sequential order until a desired connection is established, wherein the sequential order is based on at least one pre-established routing criterion and said desired connection is a hard answer condition, whereby the phone call is answered by the individual network user in person;
   determining an answer condition for each of the plurality of reference identifiers to which the phone call is routed and identifying the first reference identifier of the plurality of reference identifiers for which the answer condition is a soft answer condition, whereby the phone call is answered by an electronic service; and
   automatically re-routing the phone call to said first reference identifier a second time after the phone call has been routed to each of the plurality of reference identifiers a first time, wherein none of the plurality of reference identifiers were determined to have a hard answer condition during the first routing.

2. The method of claim 1 further comprising:
   routing the phone call to a recipient terminal associated with the initial identifier if it is determined that the initial identifier does not have the plurality of reference identifiers associated therewith.

3. The method of claim 2 further comprising:
   determining if the desired connection has been established based on at least one pre-established connection criterion, wherein the at least one criterion comprises at least one of a no-answer condition, a power-off condition, a hard answer condition, and a soft answer condition.

4. The method of claim 2 wherein:
   the plurality of reference identifiers are stored in at least one record in a database; and
   the method further comprises cross-referencing the initial identifier to the database to determine if the initial identifier has the plurality of reference identifiers associated therewith.

5. The method of claim 2 further comprising:
   receiving information from a website, said information relating to the at least one routing criterion, wherein the website is accessible by the network user; and
   establishing the sequential order based on the received information.

6. The method of claim 2 wherein:
   the initial identifier is received from a source terminal initiating the phone call; and
   the method further comprises determining if a source identifier of the source terminal is associated with a proxy identifier and, if so, initiating display of the proxy identifier, in place of the source identifier, at a recipient terminal equipped with caller ID functionality.

7. The method of claim 1, wherein the at least one pre-established routing criterion is selected from the group consisting of: a time of day, a calendar date, a type of end terminal, an answer condition of one or more of the plurality of reference identifiers to which the phone call has been routed, prior communication history associated with the proxy identifier, a call activity threshold based on a number of communications during a period of time, network traffic conditions, and a random selection.

8. A method for communicating over a network, said method comprising:
determining if an initial identifier for a phone call initiated over the network has a plurality of reference identifiers associated therewith, wherein the plurality of reference identifiers are for a plurality of terminals accessed by an individual network user;
if so, automatically routing the phone call to the plurality of reference identifiers in a sequential order until a desired connection is established, wherein the sequential order is based on at least one pre-established routing criterion and said desired connection is a hard answer condition, whereby the phone call is answered by the individual network user in person;
receiving an answer condition from each of the plurality of reference identifiers to which the phone call is routed and identifying the first reference identifier of the plurality of reference identifiers for which the answer condition is a soft answer condition, whereby the phone call is answered by an electronic service; and
automatically re-routing the phone call to said first reference identifier a second time after the phone call has been routed to each of the plurality of reference identifiers at least a first time, wherein a hard answer condition was not received from any of the plurality of reference identifiers during the first routing through the plurality of reference identifiers.

9. The method of claim 8, wherein the at least one pre-established routing criterion is selected from the group consisting of: a time of day, a calendar date, a type of end terminal, an answer condition of one or more of the plurality of reference identifiers to which the phone call has been routed, prior communication history associated with the proxy identifier, a call activity threshold based on a number of communications during a period of time, network traffic conditions, and a random selection.

10. The method of claim 8, wherein the at least one pre-established routing criterion comprises a pre-established order of the reference identifiers for the automatic sequential routing of initiated phone calls.

11. The method of claim 8, wherein:
the plurality of reference identifiers are stored in a reference list in a database; and
the method further comprises correlating the proxy identifier to the reference list in the database.

12. The method of claim 11 wherein the initial identifier is a first phone number, the proxy identifier is a proxy phone number, and the reference identifiers respectively comprise secondary phone numbers associated with a network user.

13. The method of claim 12 further comprising:
routing the phone call to the first phone number if the first phone number is determined not to be a proxy phone number.

14. The method of claim 13 further comprising:
monitoring all initiated phone calls in the network for determining if the phone numbers respectively associated therewith are proxy phone numbers.

15. The method of claim 13 further comprising:
determining if a source phone number of a terminal initiating the phone call is associated with a second proxy phone number and, if so, initiating display of the second proxy phone number, in place of the source phone number, at a recipient terminal equipped with caller ID functionality.

16. The method of claim 13 further comprising:
for each sequential routing of the phone call to the at least one of the secondary phone numbers, assessing if the desired connection has been established based on at least one pre-established connection criterion.

17. The method of claim 16 wherein the at least one pre-established connection criterion comprises at least one of a no-answer condition, a power-off condition, a hard answer condition, and a soft answer condition.

18. The method of claim 8, further comprising:
monitoring all initiated phone calls in the network for determining if initial identifiers respectively associated therewith are proxy identifiers; and
for each initiated phone call, routing the phone call to its initial identifier if the initial identifier is determined not to be a proxy identifier.

19. The method of claim 8, further comprising:
for each sequential routing of the phone call to the at least one of the plurality of reference identifiers, assessing if the desired connection has been established based on at least one pre-established connection criterion, wherein the at least one pre-established connection criterion comprises at least one of a no-answer condition, a power-off condition, a hard answer condition, and a soft answer condition.

20. The method of claim 8, further comprising:
determining if a source identifier of a terminal initiating the phone call is associated with a second proxy identifier and, if so, initiating display of the second proxy identifier, in place of the source identifier, at a recipient terminal equipped with caller ID functionality.

* * * * *